July 5, 1966  A. M. LOCKIE  3,259,801
PROTECTIVE SYSTEM
Filed Jan. 31, 1963

WITNESSES
Theodore F. Wrobel
James T. Young

INVENTOR
Arthur M. Lockie
BY
F. E. Browder
ATTORNEY

United States Patent Office 3,259,801
Patented July 5, 1966

3,259,801
PROTECTIVE SYSTEM
Arthur M. Lockie, Hickory Township, Mercer County, Pa., assignor to Westinghouse Electric Corporation, Pittsburgh, Pa., a corporation of Pennsylvania
Filed Jan. 31, 1963, Ser. No. 255,247
6 Claims. (Cl. 317—12)

This invention relates generally, to protective systems and, more particularly, to systems for protecting capacitive apparatus in power-distribution systems.

Series-connected capacitors, utilized for voltage correction in power-distribution systems, have a voltage applied across their terminals which is proportional to the current which flows through them. Likewise, in a distribution transformer of the type described in a copending application of H. W. Book, Serial No. 786,468, filed January 13, 1959, having a winding construction which provides capacitance between adjacent turns of the windings which is effectively connected in series with one of the windings, the voltage across the capacitance is proportional to the current in the winding. In general, it is uneconomical to construct the capacitor or the capacitance section of the transformer to withstand the voltages which would be developed by current of more than a few times the rated current. Thus, it is desirable to provide a device which will limit the voltage applied to capacitive apparatus. Such devices have been developed or proposed but they have, heretofore, been expensive, or unable to carry the current which might result from a fault on a large distribution transformer, or require replacement of parts, or manual resetting to restore the capacitor to service after the overvoltage which caused the protector to operate has disappeared.

Another problem in the use of series capacitors and transformers having a built-in capacitance is their protection against excessive thermal deterioration caused by overloading. The insulation utilized in capacitors and transformers deteriorates upon exposure to high temperatures, and this deterioration is a function of temperature and time. However, temperature is particularly significant since the losses in the dielectric system increase rapidly with increasing temperature, causing an additional increase in the temperature. This may, in extreme cases, cause a self-sustaining process, called "runaway heating," which will destroy the apparatus in a short period of time.

When operated below the "runaway" point, loads causing a fairly high temperature for a short time may be no more harmful than lesser loads sustained for a longer time. Furthermore, it is desirable to maintain the capacitor or the transformer on the line to perform its intended function under all combinations of load, time and ambient temperature which will not result in excessive deterioration of the dielectric system, but to take it out of service whenever the rate of deterioration becomes excessive. Thus, a protective device is needed which may be coordinated with the permissible temperature-time characteristic of the apparatus to be protected.

Accordingly, an object of this invention is to provide economical overvoltage protection for capacitive apparatus so that said apparatus will not be destroyed by large fault currents.

Another object of the invention is to provide overload protection which coordinates with the thermal capability of the capactive apparatus, including the effect of ambient temperature.

A further object of the invention is to provide a combined overvoltage and overload protective device for capacitive apparatus.

Still another object of the invention is to provide means for automatically restoring the capacitive apparatus to normal functioning when the abnormal conditions which caused operation of the protective device have ceased to exist.

Other objects of the invention will be explained fully hereinafter or will be apparent to those skilled in the art.

In accordance with one embodiment of the invention, a device for protecting capacitive apparatus includes a voltage-sensitive element, connected across terminals of the protected apparatus, and a thermo-responsive element connected in series with the apparatus. The voltage-sensitive element acts to limit voltages which may appear across the apparatus terminals. The thermo-responsive element acts to close contact members which establish a circuit parallel to the terminals of the apparatus and the voltage-sensitive element. After the abnormal conditions which caused operation of the protective device have ceased, the thermo-responsive element will act to disconnect the parallel circuit, thereby restoring the apparatus to normal operation.

For a better understanding of the nature and objects of the invention, reference may be had to the following detailed description, taken in conjunction with the accompanying drawing, in which.

Figure 1:
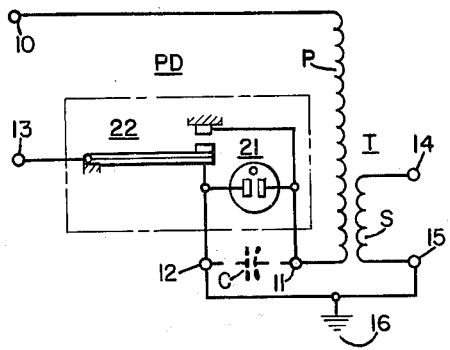
FIGURE 1 is an equivalent schematic diagram of the windings of a capacitive transformer protected by a protective device embodying the principal features of the invention.

Referring to the drawing, and particularly to FIG. 1, the structure shown therein comprises a transformer T and a protective device PD. The transformer T may be of the type described in the aforesaid copending application, Serial No. 786,468. As shown, the transformer comprises a primary winding P and a secondary winding S. The windings are disposed on a magnetic core (not shown). As described in the aforesaid application, the first or primary winding P comprises a plurality of turns of a first layer of conducting sheet material and a second layer of insulating sheet material which are spirally wound together about a portion of the magnetic core. Likewise, the secondary winding S also includes a plurality of turns of a layer of conducting sheet material and two layers of insulating sheet material which are disposed on opposite sides of the conducting sheet material. In general, the turns of the secondary winding S are wound simultaneously interleaved with, at least a portion of the turns of the primary winding P.

Because of the insulating and conducting materials utilized and the manner in which the turns of the primary and secondary windings are continuously interleaved, a predetermined capacitance results between the adjacent turns of the transformer windings. This capacitance is represented by the reference character C. As illustrated, only the outer end or turn of the primary winding P is adapted for connection to an external alternating current circuit of source, as indicated at the terminal 10. The inner end of the first winding P, as indicated at the terminal 11, is not adapted for directed electrical connection to an external power circuit. The secondary winding S is connected across terminals 14 and 15 which may be connected to a load circuit (not shown). The terminal 15 of the secondary winding S is connected to a ground connection 16 and also to a terminal 12. The protective device PD is connected across the terminals 11 and 12, as shown. A terminal 13 of the protective device PD and the terminal 10 may be connected to an alternating current power source (not shown).

As described in the aforesaid copending application, the distributed capacitance between the adjacent turns of the primary and secondary windings has the effect of a capacitance connected in series with the primary winding P and it may be considered as a single lump capacitance represented by C. As shown, the capacitance C is in series with the primary winding P. The capacitance C may be built into the transformer structure, as described in the aforesaid copending application, or the capacitance C may be an external capacitance connected in series with the transformer. In either case the current through the capacitance C varies with or is dependent upon the current which flows to a load connected across the secondary winding S at the terminals 14 and 15 when a potential is applied to the terminals 10 and 13.

Thus, as described hereinbefore, the voltage across the terminals 11 and 12 of the capacitor C is proportional to the current which flows through the capacitor. In order to limit the voltage which would be developed across the capacitor by a heavy overload current, the protective device PD is provided. As previously stated, the device PD is connected across the terminals 11 and 12 of the capacitance C which is connected in series with the primary winding P.

Figure 2:
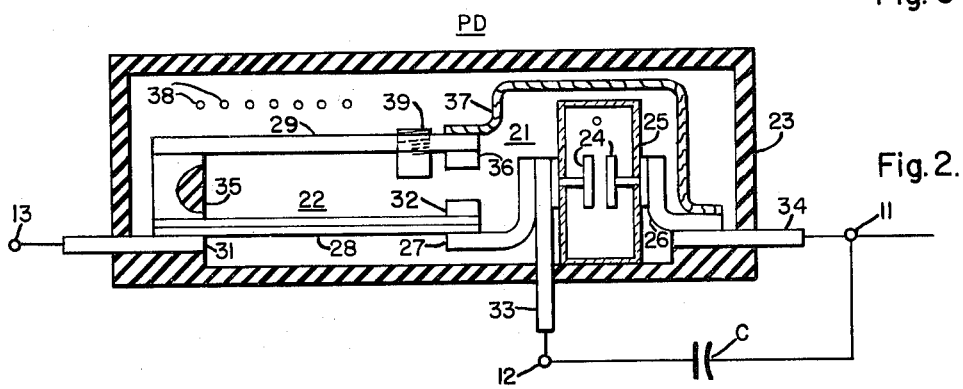
FIG. 2 is a diagrammatic view of the protective device.

As shown more clearly in FIG. 2, the protective device PD comprises a voltage-sensitive element 21 and a thermo-responsive element 22 which are disposed inside a housing 23. The voltage-sensitive element 21 is connected directly across the terminals 11 and 12 of the capacitor C, and is so made that it will bypass current through a parallel circuit around the capacitor when the voltage across the terminals of the capacitor exceeds a predetermined safe value. The thermo-responsive element 22 is connected in series with the circuit to which the capacitor is connected and is so made that it will perform three functions. First, when load and ambient temperature conditions are such as to cause an excessive deterioration of the capacitor, it will function to bypass the load current around the capacitor. Second, on fault current causing development of voltages which will cause the voltage-sensitive element to operate, the thermo-responsive element will act quickly to bypass this current around the voltage-sensitive element and also around the capacitor, so that neither will suffer damage. Third, after the abnormal conditions which cause operation of the protective device have ceased to exist, this element will act to disconnect the parallel circuits, thereby permitting the capacitive apparatus to resume normal operation.

As explained hereinbefore, the voltage developed across the terminal of a series-connected capacitance is proportional to the current flowing through the capacitance. Thus, the thermo-responsive element, which is energized by the current flowing through the capacitance may be constructed to provide overvoltage protection without the need of a separate voltage-sensitive element. However, in most cases, it is desirable to provide a voltage-sensitive element and the thermo-responsive element.

A shown in FIG. 2, the voltage-sensitive element 21 comprises a pair of spaced electrodes 24 which are disposed inside a sealed container 25. The container 25 is filled with a gas, such as argon, at reduced pressure. By the suitable choice of the gas, pressure and electrode spacing and configuration, this device may be constructed to provide an extremely high impedance, approximately that of an open circuit, to voltages below a critical value. At higher voltages a discharge, commonly known as a "glow" discharge, occurs between the electrodes. Such discharges are characterized by the absence of local heating, so that very large currents may be passed for a brief period without causing a destructive temperature rise. In the present case, the device is so constructed that its discharge voltage is less, by a predetermined amount, than a voltage which the protected capacitance can withstand.

Alternatively, the voltage-sensitive element may comprise a plurality of semiconducting junction diodes, generally known as zener diodes, so connected as to provide an extremely high impedance to applied voltages below the breakdown voltage of the zener diodes, but to have a low impedance at voltages above the breakdown voltage of the diodes. Thus, a number of diodes may be utilized to provide a breakdown voltage below the voltage which the capacitive apparatus can withstand.

With either construction, the voltage-sensitive element 21 is connected across the terminals 11 and 12 of the protected capacitive apparatus C by means of conductors 26, 34 and 33. If, then, the voltage across the capacitance C becomes excessive because of the passage of abnormally high current, the device establishes a circuit parallel to the capacitance and bypasses current around the capacitance to maintain the applied voltage at a safe level.

As also shown in FIG. 2, the thermo-responsive element 22 comprises a bimetallic strip 28 and a second strip 29 which may or may not be bimetallic. One end of the strip 28 is fastened to a support 31 which is electrically connected to the terminal 13. The other end of the strip 28, which is free to move, carries a contact member 32. The free end of the strip 28 is electrically connected to the conductor 27 which is electrically connected to a support 33 which, in turn, is connected to the terminal 12 of the capacitance C. As previously explained, the conductors 27 and 26 are connected to the electrodes 24 of the voltage-sensitive element 21. The conductor 26 is connected to a support 34 which is connected to the terminal 11 of the capacitance C. Thus, the bimetallic strip 28 is connected in series relationship with the parallel-connected capacitance C and voltage-sensitive element 21, and is in series with the power circuit in which the capacitance C is connected. Therefore, under normal conditions, current will pass from the terminal 13 consecutively through the bimetallic strip 28 and the capacitance or capacitive apparatus C. This current will heat the bimetallic strip, and also the surrounding air, or other medium, to a temperature which will be a function of time and the magnitude of the current. Thus, the temperature of the strip, and, consequently, its curvature, if any, will be determined by a combination of current, time and ambient temperature. As previously stated, one end of the strip 28 is rigidly fastened to the support 31. The other end is free to move under the influence of temperature, being deflected upwardly by a temperature increase.

As shown, the strip 29 is parallel to and spaced from the strip 28. One end of the strip 29 is rigidly fastened to an insulating spacing member 35 disposed between the ends of the strips 28 and 29. The other end of the strip 29, which is free to move, carries a contact member 36 which is disposed to be engaged by the contact member 32. The free end of the strip 29 is electrically connected to the conductor 26 and the support 34 by a conductor 37. Under normal conditions the contact members 32 and 36 are in the open-circuit positions.

Assuming that the strip 29 is not bimetallic, the spacing between contact members 32 and 36 will be determined by the curvature of the strip 28, and at some particular curvature will reach closed circuit position. The curvature of strip 28 is a function of its temperature which is dependent upon the current in the strip, the time duration of that current and ambient temperature. These same factors determine the temperature existing in the protected capacitance. Thus, by suitably selecting the thermal characteristics of the strip 28 and by suitable construction of the surrounding structure 23, a degree of coordination between the thermo-responsive element and the thermal capability of the capacitance may be achieved, whereby, whenever the temperature developed in the capacitance reaches a dangerously high value the thermo-responsive element will actuate contacts 32 and 36 into closed circuit position. Closing of the contact members 32 and 36 establishes a parallel circuit through conductor 37 which bypasses the current in the outer circuit around the capacitance, and also around the voltage-sensitive element, thereby preventing dangerous overheating of the capacitance.

It will be noted that in performing the overload protective function, some time delay is necessary and desirable to coordinate with the thermal capability of the capacitance. This is accomplished by so constructing the strip 28 and the surrounding structure that the contact members 32 and 36 are not closed until after appreciable heating of the surrounding medium by the heat generated in strip 28.

On current sufficiently large to actuate the voltage-sensitive element 21, it is essential to close the contact members 32 and 36 very quickly to avoid damage to the voltage sensitive element. This may be done by selecting the properties of the strip 28 so that, when passing the larger current, sufficient heat will be generated in the strip 28 to close the contact members without the necessity for heating the surrounding medium. This rapid closing of the contact members bypasses the large current around the voltage-sensitive element and prevents destruction of the element.

It will be noted further that, when the abnormal current resulting in the closing of the contact members 32 and 36 has returned to a value which may be safely carried by the capacitance, the strip 28 will cool and deflect downwardly, thereby opening the contact member and restoring the capacitance or capacitive apparatus to normal service, and accomplishing the third desired function of the protective system.

While the basic elements of the thermo-responsive device described in the foregoing are sufficient to perform the necessary operations, some additional features may be desirable to improve thermal coordination with the capacitance, prolong contact life, and facilitate calibration of the device. In order to improve thermal coordination, the strip 29 may be composed of bimetallic to alter the effect of ambient temperature on the relative position of the contact members 32 and 36. A medium, other than air, may be provided within container 23 to alter the thermal emissivity of the strip 28, or to alter the thermal coupling between the strips 28 and 29 when the latter is bimetallic. Also, the housing 23 may be ventilated, as by opening 38, to improve the circulation of the surrounding medium.

In order to improve contact life, a permanent magnet 39 may be mounted on the strip 29. The magnet action on the strip 28 will cause the contact members 32 and 36 to open and close with a snap action. If desired, an electromagnet 39', shown in FIG. 3, may be energized by the current flowing in conductor 37' to provide additional contact pressure on heavy fault currents.

Figure 3:
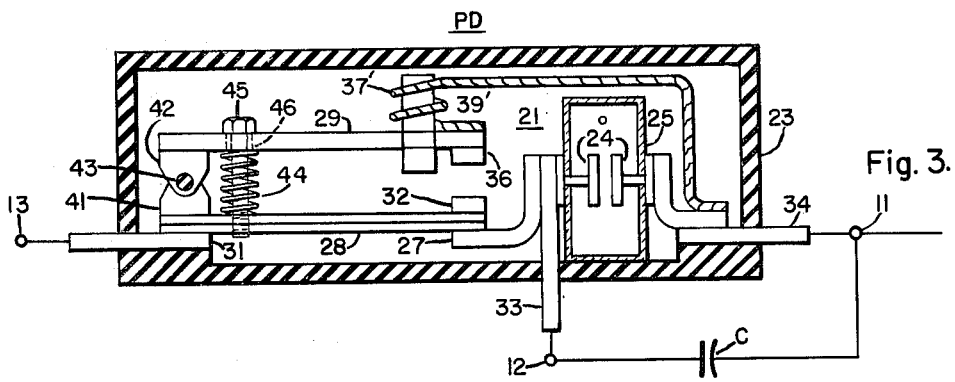
FIG. 3 is a diagrammatic view of a modification of the device shown in FIG. 2.

In order to facilitate calibration, a spring biased, pivotal connection between the strips 28 and 29 may be provided. As shown in FIG. 3, a yoke 41 is attached to the fixed end of the strip 28 and a yoke 42 is attached to the corresponding end of the strip 29. The yokes 41 and 42 are pivotally connected by an insulated pivot member 43. A compression spring 44 surrounds a screw 45 which is threaded into the strip 28. The screw 45 passes freely through an enlarged opening 46 in the strip 29. Spring 44 and screw 45 are made of insulating material, or are insulated from strip 29. Thus, the relative position of the contact members 32 and 36 may be adjusted by rotation of the screw 45. Also, as shown in FIG. 2, the magnet 39 may be threaded into the strip 29 to permit adjustment of the magnetic force exerted on the strip 28 by the magnet.

As described in the foregoing, the voltage-sensitive element and the thermo-responsive element cooperate to provide both overvoltage and overload protection for the capacitor or capacitive apparatus. When the capacitor is utilized in conjunction with a self-protecting transformer, overload protection for the capacitor may be unnecessary, as that function may be adequately performed by a circuit breaker contained in the transformer. In such cases, overvoltage protection for the capacitor or the capacitance in the transformer is still necessary and a protective device is needed which will protect the capacitive apparatus against excessive voltage, protect the voltage-sensitive element against damage by excessive currents, and restore the capacitive apparatus to normal service when the overvoltage condition is passed.

Figure 4:
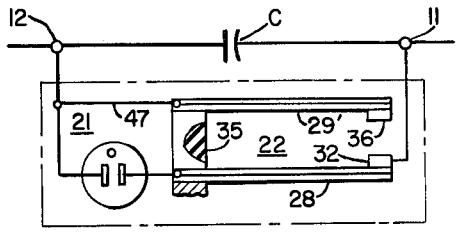
FIGS. 4 and 5 are diagrammatic view of further modifications of the protective device.

In order to accomplish the foregoing objectives, the voltage-sensitive element 21 and the thermo-responsive element 22 may be connected in a manner shown in FIG. 4. The voltage-sensitive element 21 is connectd in series with the bimetallic strip 28. The strip 29' is also bimetallic and one end of this strip is supported by the insulating spacer 35. The free end of the strips 28 and 29' carry the contact members 32 and 36, respectively. The strips 28 and 29' are so disposed that an increase of temperature causes the free ends to move the contacts 32 and 36 toward circuit closing position.

Upon the occurrence of an overvoltage, the voltage-sensitive device 21 will bypass current around the capacitance C through the strip 28, thereby protecting the capacitance against overvoltage. The strip 28 is so constructed that the current flowing through the strip will cause it to deflect upwardly very rapidly to close the contact members 32 and 36. The closing of the contact members bypasses the current flow around the voltage-sensitive element 21 and the strip 28, thereby protecting them from damage by overheating.

Upon closure of the contact members, the discharge through the voltage-sensitive element 21, and consequently the flow of current to the bimetallic strip 28, will cease. The temperature of the strip 28 will then decrease and it will move in a direction tending to open the contact members. Simultaneously, however, the bimetallic strip 29' will be heated by the bypassed current and will move in a direction to maintain the contact members 32 and 36 closed. By proper coordination in the design and the structure of strips 28 and 29' the contact members may be maintained in the closed-circuit position as long as the abnormal condition which caused the protective device to operate exist. Upon cessation of the abnormal condition, strip 29' will cool and move to open the contact members 32 and 36, thereby restoring the protective capacitive apparatus to normal operation.

In order to prevent undesirable effect of changes in the ambient temperature on the performance of the protected system the strips 28 and 29' may be provided with any of the various well-known means of ambient temperature compensation. Further modifications to improve contact life and to facilitate calibration, similar to those described hereinbefore, may also be provided.

Figure 5:
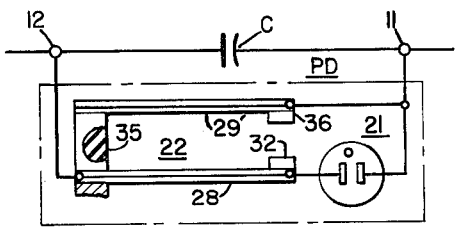

In cases in which it is not necessary to provide protection for the bimetallic strip 28, as when the magnitude or duration of abnormal current is limited by external circuit elements to values which will not result in overstressing of the strip, the modified connections shown in FIG. 5 may be utilized. As shown, when the contact members 32 and 36 are closed the current which bypasses the voltage-sensitive element 21 continues to flow through the strip 28. Since the bypassed current does not flow through the strip 29' this strip may then be used for ambient temperature compensation only, thereby simplifying construction and reducing cost.

In comparing the systems disclosed in FIGS. 4 and 5 with that of FIG. 2, it will be noted that they do not protect the capacitive apparatus against thermal damage by overloads which do not develop voltage across the capacitance sufficient to operate the voltage-sensitive element. However, this permits greater freedom in the design of the strip 28 so as to provide a higher degree of protection for the voltage-sensitive element. Furthermore, each of the structures shown in FIGS. 4 and 5 require but two external connections, whereas the structures shown in FIGS. 2 and 3 each require three external connection.

From the foregoing description it is apparent that the invention provides for protecting a capacitance which may be either an external capacitor or which may be built into a transformer structure. The device provides economical overvoltage protection which will not be destroyed by large fault currents. It provides overload protection which is coordinated with the thermal capability of the capacitive apparatus protected. It also provides means for automatically restoring the capacitive apparatus to normal operation when the abnormal conditions which necessitate an operation of the protective device have ceased.

Since numerous changes embodying the invention may be made without departing from its scope, it is intended that the accompanying description and drawing shall be interpreted as illustrative and not as limiting.

I claim as my invention:

1. A protective device for capacitive apparatus comprising thermo-responsive means connected in series circuit relation with said capacitive apparatus, voltage sensitive means connected in parallel circuit relation with said capacitive apparatus, said voltage sensitive means having the characteristic of being substantially an open circuit until a predetermined voltage is reached, at which time current is allowed to flow, means including normally open contacts connected in parallel circuit relation with said voltage sensitive means, said normally open contacts being responsive to said thermo-responsive means, with said normally open contacts closing when the temperature of said thermo-responsive means reaches a predetermined magnitude, and opening again when the temperature of said thermo-responsive means drops below a predetermined magnitude, said thermo-responsive means being heated by current flow therethrough and by the ambient temperature, said thermo-responsive means protecting said capacitive apparatus when the current through said thermo-responsive means and ambient temperature cause said thermo-responsive means to reach a predetermined temperature and close said normally open contacts to establish a circuit in parallel with said capacitive apparatus, said voltage sensitive means protecting said capacitive apparatus by establishing a circuit in parallel with said capacitive apparatus when the voltage across said capacitive apparatus reaches a predetermined magnitude, said thermo-responsive means protecting said voltage sensitive means after said voltage sensitive means has established a circuit in parallel with said capacitive apparatus, by closing the normally open contacts and establishing a circuit in parallel with said voltage sensitive means, said thermo-responsive means opening the normally open contacts to restore said capacitive apparatus to normal operation when the temperature of said thermo-responsive means drops below a predetermined magnitude.

2. In combination, a transformer having primary and secondary windings each having first and second terminals, at least a portion of said primary and secondary windings being interleaved to provide a distributed series capacitance effectively connected in series with said primary winding, the first terminal of said primary winding and the second terminal of said secondary winding being adapted for connection to a source of alternating potential, said first and second terminals of said secondary winding being adapted for connection to a load circuit, the second terminal of said primary winding being effectively connected to the second terminal of said secondary winding through said distributed series capacitance, a protective device for bypassing said distributed series capacitance upon certain predetermined voltage and temperature conditions, said protective device including thermo-responsive means, voltage sensitive means, and normally open contacts, said thermo-responsive means being connected in series circuit relation with said primary winding, said voltage sensitive means being connected from the second terminal of said primary winding, said normally open contacts being connected from the second terminal of said primary winding to the second terminal of said secondary winding, said normally open contacts being responsive to said thermo-responsive means, with said normally open contacts closing when said thermo-responsive means reaches a predetermined temperature and opening when the temperature of said thermo-responsive means drops below a predetermined magnitude, said voltage sensitive means having the characteristic of blocking current flow from a predetermined voltage and allowing current flow above a predetermined voltage, said thermo-responsive means protecting said transformer when current flow in said primary winding and ambient temperature cause said thermo-responsive means to reach a predetermined temperature and close said normally open contacts to establish a circuit in parallel with said distributed series capacitance, said voltage sensitive means protecting said transformer by establishing a circuit in parallel with said distributed series capacitance when the voltage across said distributed series capacitance reaches a predetermined magnitude, said thermo-responsive means protecting said voltage sensitive means after it has established a circuit in parallel with said distributed series capacitance by closing said normally open contacts and establishing a circuit in parallel with said voltage sensitive means, said thermo-responsive means opening said normally open contacts to restore said transformer to normal operation when the temperature of said thermo-responsive means drops below a predetermined magnitude.

3. A protective device for capacitive apparatus, comprising first and second thermo-responsive means, voltage sensitive means, normally open contacts, said first thermo-responsive means and said voltage sensitive means being connected serially across said capacitive apparatus to form a first circuit in parallel with said capacitive apparatus, said second thermo-responsive means and said normally open contacts being connected serially across said capacitive apparatus to form a second circuit in parallel with said capacitive apparatus, said normally open contacts being responsive to both said first and second thermo-responsive means, with said normally open contacts being closed when either said first or second thermo-responsive means is above a predetermined temperature, and being open when both said first and said second thermo-responsive means are below predetermined temperatures, said voltage responsive means blocking current flow below a predetermined voltage and allowing current flow above a predetermined voltage, said voltage sensitive means protecting said capacitive apparatus by allowing current to flow through said first parallel circuit when the voltage across said capacitive apparatus reaches a predetermined magnitude, the current flow through said first parallel circuit causing said first thermo-responsive means to close said normally open contacts to allow current to flow through said second parallel circuit, the current flow through said second parallel circuit causing said second thermo-responsive means to maintain said normally open contacts in a closed position until the temperature of said second thermo-responsive means falls below a predetermined magnitude.

4. In combination, a transformer having primary and secondary windings each having first and second terminals, at least a portion of said primary and secondary windings being interleaved to provide a distributed series capacitance effectively connected in series with said primary winding, the first terminal of said primary winding and the second terminal of said secondary winding being adapted for connection to a source of alternating potential, said first and second terminals of said secondary winding being adapted for connection to a load circuit, the second terminal of said primary winding being effectively connected to the second terminal of said secondary winding through said distributed series capacitance, a protective device for by-passing said distributed series capacitance upon predetermined voltage conditions, said protective device including first and second thermo-responsive means, voltage sensitive means, and normally open contacts, said first thermo-responsive means and said voltage sensitive means being connected serially between the second terminals of said primary and secondary windings to form a first circuit in parallel with said distributed series capacitance, said second thermo-responsive means and said normally open contacts being connected serially between the second terminals of said primary and secondary windings to form a second circuit in parallel with said distributed series capacitance, said normally open contacts being responsive to both said first and second thermo-responsive means, with said normally open contacts being closed when either said first or second thermo-responsive means is above a predetermined temperature, and being open when both said first and second thermo-responsive means are below predetermined temperatures, said voltage responsive means having the charactristic of blocking current flow below a predetermined voltage and allowing current flow above a predetermined voltage, said voltage sensitive means protecting said transformer by allowing current to flow through said first parallel circuit when the voltage across said distributed series capacitance reaches a predetermined magnitude, the current flow through said first parallel circuit causing said first thermo-responsive means to close said normally open contacts to allow current to flow through said second parallel circuit, the current flow through said second parallel circuit causing said second thermo-responsive means to maintain said normally open contacts in a closed position until the temperature of said second thermo-responsive means falls below a predetermined magnitude.

5. A protective device for capacitive apparatus comprising, first and second thermo-responsive means, voltage sensitive means, normally open contacts, said first thermo-responsive means and said voltage sensitive means being connected serially across said capacitive apparatus, said normally open contacts being connected across said voltage sensitive means, said normally open contacts being responsive to said first thermo-responsive means, with said normally open contacts closing when said first thermo-responsive means is above a predetermined temperature and opening when said first thermo-responsive means is below a predetermined temperature, said second thermo-responsive means being responsive to ambient temperature to control the gap between said normally open contacts, said voltage sensitive means having the characteristic of blocking current flow below a predetermined voltage and allowing current to flow above a predetermined voltage, said voltage sensitive means protecting said capacitive apparatus by allowing current to flow through said voltage sensitive means and said first thermo-responsive means when the voltage across said capacitive apparatus reaches a predetermined magnitude, the current flow through said first thermo-responsive means closing said normally open contacts to allow the current to by-pass said voltage sensitive means, said first thermo-responsive means opening said normally open contacts when the temperature of said thermo-responsive means falls below a predetermined magnitude, to return said capacitive apparatus to normal operation.

6. In combination, a transformer having primary and secondary windings, each having first and second terminals, at least a portion of said primary and secondary windings being interleaved with one another to provide distributed series capacitance effectively connected in series circuit relation with said primary winding, the first terminal of said primary winding and the second terminal of said secondary winding being adapted for connection to a source of alternating potential, said first and second terminals of said secondary winding being adapted for connection to a load circuit, the second terminal of said primary winding being effectively connected to the second terminal of said secondary winding through said distributed series capacitance, a protective device for by-passing said distributed series capacitance upon predetermined voltage conditions, said protective device including first and second thermo-responsive means, voltage sensitive means, and normally open contacts, said first thermo-responsive means and said voltage sensitive means being connected serially between the second terminals of said primary and secondary windings, said normally open contacts being connected across said voltage sensitive means, said normally open contacts being responsive to said first thermo-responsive means, said normally open contacts closing when said thermo-responsive means is above a predetermined temperature and opening when said first thermo-responsive means falls below a predetermined temperature, said second thermo-responsive means being responsive to ambient temperature to control the open distance between said normally open contacts, said voltage sensitive means having the characteristic of blocking current flow below a predetermined voltage and allowing current flow above a predetermined voltage, said voltage sensitive means protecting said transformer by allowing current to flow through said voltage sensitive means and said thermo-responsive means when the voltage across said series capacitance reaches a predetermined magnitude, the current flow through said first thermo-responsive means closing said normally open contacts to protect said voltage sensitive means by allowing current to by-pass said voltage sensitive means, said first thermo-responsive means opening said normally open contacts when the temperature of said first thermo-responsive means falls below a predetermined magnitude, to restore said transformer to normal operation.

References Cited by the Examiner

UNITED STATES PATENTS

| | | | |
|---|---|---|---|
| 1,973,538 | 9/1934 | Moffett | 317—16 X |
| 2,413,327 | 12/1946 | Leverte | 317—40 X |
| 2,819,429 | 1/1958 | Sketas | 317—16 X |
| 3,116,437 | 12/1963 | Harvey | 317—15 X |

MILTON O. HIRSHFIELD, *Primary Examiner.*

SAMUEL BERNSTEIN, *Examiner.*

R. V. LUPO, *Assistant Examiner.*